Sept. 13, 1932.   C. H. ERWIN   1,877,652
ROD WEEDER
Filed Nov. 26, 1930   2 Sheets-Sheet 2
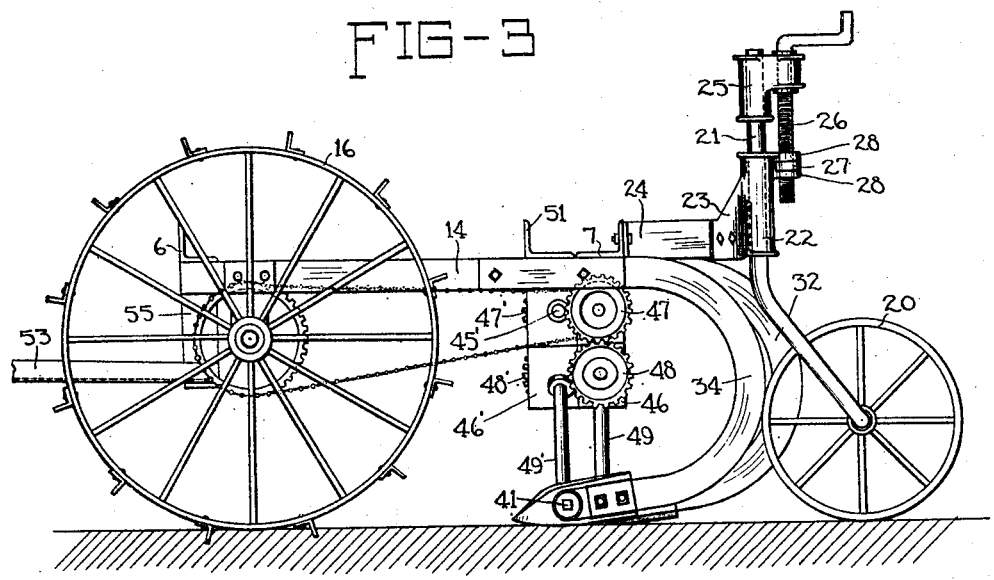
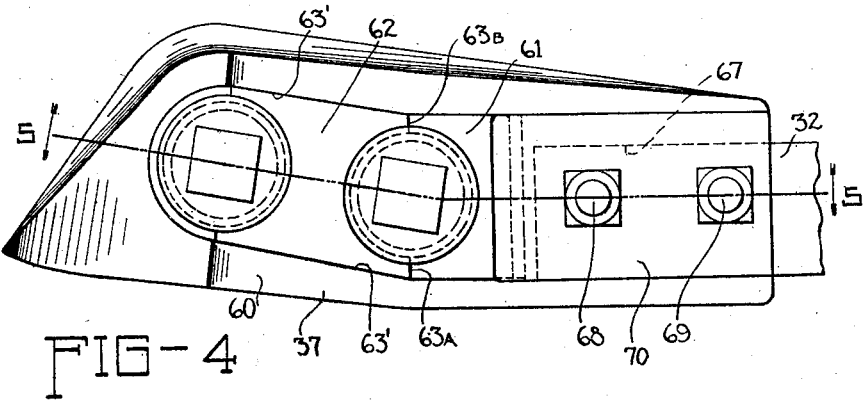
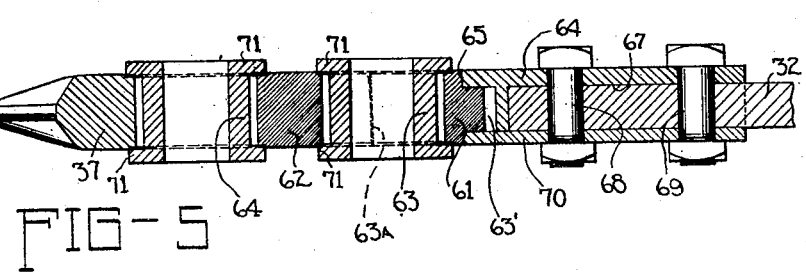
INVENTOR
Charles Howard Erwin
BY
ATTORNEY Patented Sept. 13, 1932

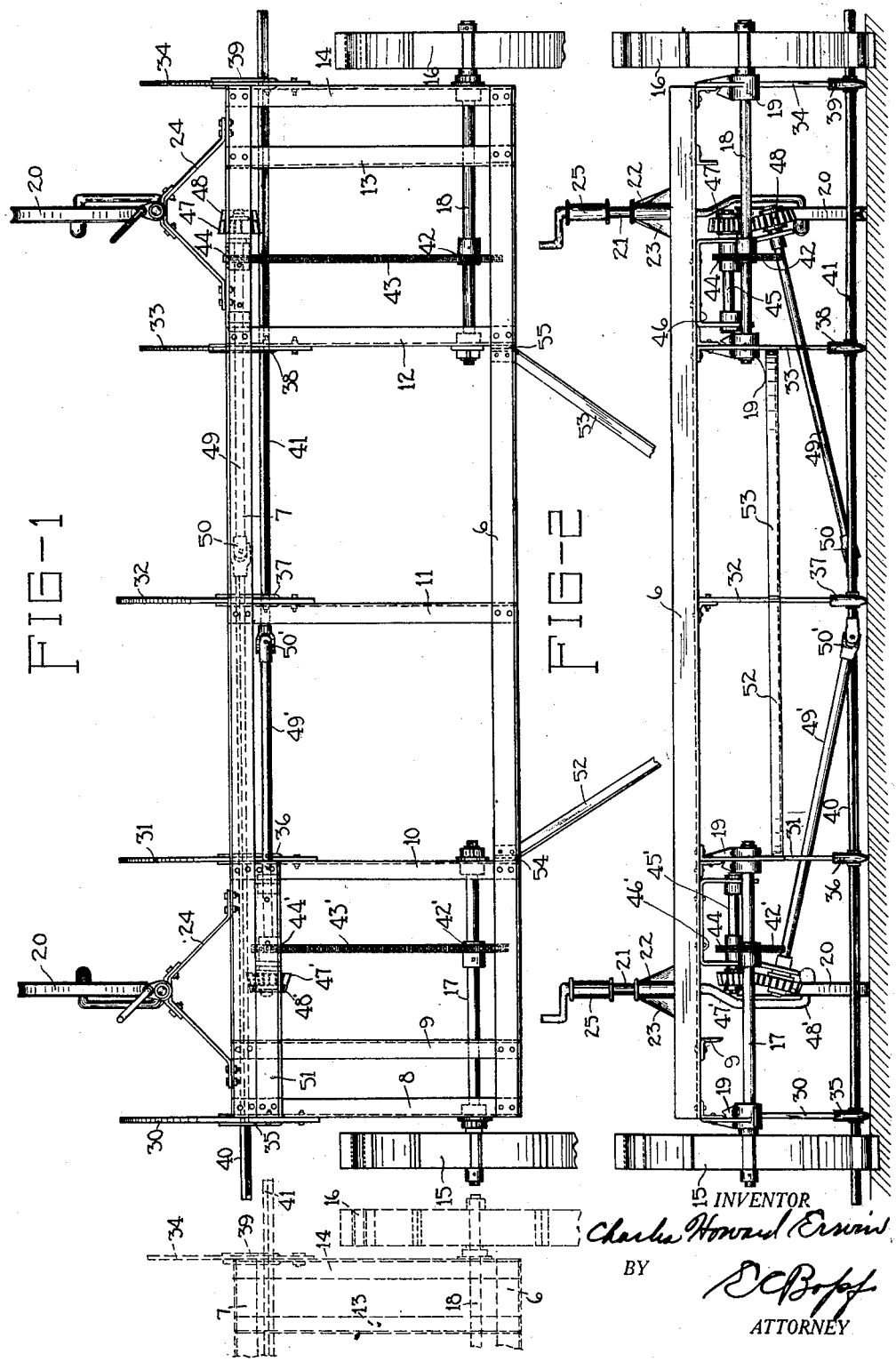

1,877,652

UNITED STATES PATENT OFFICE

CHARLES HOWARD ERWIN, OF PRESCOTT, WASHINGTON, ASSIGNOR TO DEERE & COMPANY, OF MOLINE, ILLINOIS, A CORPORATION OF ILLINOIS

ROD-WEEDER

Application filed November 26, 1930. Serial No. 498,339.

The present invention relates generally to agricultural implements, and particularly to rotary rod weeders.

The rod weeder that is at the present time more or less generally in use comprises a single revolving rod journaled in the lower ends of pendants fixed to a wheel supported framework. Power for rotating the rod is derived from one of the supporting wheels through a chain and gear drive including a downwardly and inwardly inclined drive shaft connected with one end of the rotating rod through a universal joint. Because of this inclined drive shaft connection with one end of the rotating rod, the frame of the machine must be built out considerably farther than the end of the rod to provide a support for the upper end of the inclined drive shaft. With the present machine, therefore, it is impossible to cultivate the ground close to fences at the side of the machine from which the rotating rod is driven. Furthermore, the width of the strip cultivated is appreciably narrower than the width of the machine, because of this necessity of having to provide a supporting framework appreciably wider than the length of the rod.

In certain sections of the country, where large tracts of land are cultivated with rod weeders, it is common practice to connect a plurality of independent machines to a common draft means. With the present type of machine now in use since the frame of the machine extends out considerably farther than the end of the rotating rod on the end at which power is applied thereto, it is necessary to position each machine either back of or in front of the adjacent machine in order that the rotating rods themselves may overlap sufficiently to assure complete cultivation of the full swath being operated upon. Since this positioning causes the machines to be considerably out of transverse alinement, complicated and more or less unsatisfactory hitch devices are required which at best give considerable difficulty in turning.

The main object of my invention is the provision of a machine in which these undesirable features of the present rod weeder now in use are obviated. I accomplish this object by providing a rod weeder having two rotating rods, overlapping a slight amount at the center of the machine and extending to opposite sides of the machine beyond the ends of the frame and outside the tread of the carrying wheels. I drive the two rods from their inner ends and thus obviate the necessity of having to provide a framework at one end of the machine projecting out beyond the end of the rod as is necessary in the present type of machine now in use. With my machine I am able to operate upon a strip of soil as wide or wider than the overall width of the machine. Thus it is possible to operate close to fences as well as to the very edge of that portion of a field being cultivated without running the wheels of the machine upon the portion upon which crops have been planted. I am also able to operate the machines in multiple without having to connect adjacent machines in offset relation transversely to obtain an overlapping of the rods of adjacent machines, thus making it possible to use a simpler hitch device and without incurring any trouble in turning.

Another object incidental to the main object is to provide a rod weeder having two rotating rods in which one of the rods is driven from one of the supporting wheels, and the other rod is driven from another supporting wheel, each rod preferably by the wheel on the side of the machine opposite to the rod. I find this the most convenient and inexpensive way of driving the two rods. However, if desired each rod may be driven from the supporting wheel nearest the rod. It is also within the purview of my invention to drive both rods from a single wheel or from both wheels through a differential drive connection, or through a power take-off connection from the tractor when a tractor is used to pull the machine.

Other objects and advantages of my invention will be apparent from the following description of a preferred embodiment thereof.

In the accompanying drawings illustrating such embodiment:

Figure 1 is a top view of a rod weeder constructed in accordance with my invention and showing in dotted lines the position taken by an adjacent machine when the two are operated in multiple;

Figure 2 is a front view of the rod weeder;

Figure 3 is an end view;

Figure 4 is an enlarged view of the shoe for the center pendant in which the inner ends of both rods are journaled; and, Fig. 5 is a cross-sectional view along the line 5—5 of Figure 4.

The frame of the implement comprises two transversely extending angle bars 6 and 7 which are cross-connected at spaced points by longitudinally extending angle bars 8 to 14 riveted or bolted to the under sides of the transverse frame bars. The forward portion of the frame is supported on two wheels 15 and 16, positioned on opposite sides of the frame, and mounted on axles or shafts 17 and 18. Shafts 17 and 18 are journaled in bearings supported in brackets 19 depending from angle bars 8, 10, 12 and 14, respectively.

The rear portion of the frame is supported on a pair of caster wheels 20 journaled on the lower rearwardly bent portion of vertical spindles 21. Spindles 21 are journaled in the sleeve portion 22 of castings 23 bolted to V-shaped brackets 24 which extend rearwardly from and are bolted to the rear frame member 7. A cap 25 rests on the upper end of spindles 21, and supports the frame through a crank screw 26 which is journaled in a vertical boring in a rearward projection on cap 25. The threaded portion of screw 26 extends through perforations in lugs 28 on sleeves 22, and threads into a nut 27 positioned between the lugs 28 on sleeves 22.

Rigidly secured to the longitudinal bars 8, 10, 11, 12 and 14 is a series of pendants 30 to 34 which extend rearwardly from the frame and are curved downwardly and forwardly in gooseneck formation. Pendants 33 and 34 are positioned slightly in advance of pendants 30, 31 and 32. The lower ends of the pendants are adapted to carry rotary rods, and are provided with shoe-like bearing housings or shoes 35 to 39 for this purpose. A rod 40 extends from a point just to the right of pendant 32 transversely to a point beyond the tread of the carrying wheel 15, and is journaled in shoes 35, 36 and 37. Similarly a second rod 41, spaced slightly in advance of rod 40, but for all practical purposes in substantial transverse alignment with rod 40, extends from a point just to the left of pendant 32 outwardly to a point beyond the tread of wheel 16 and is journaled in shoes 37, 38 and 39. Shoes 35, 36, 38 and 39 may be of the type shown in the application of Frank T. Court, Serial No. 552,930, filed July 24, 1931. The shoe 37, however, is of a special design adapted to support two rods instead of one. This shoe is shown in detail in Figures 4 and 5 and will be described more in detail presently.

Rod 40 is rotated by power derived from carrying wheel 16 and rod 41 is driven by power derived from the carrying wheel 15. The driving mechanism for rod 40 comprises a sprocket wheel 42 pinned or otherwise fixed to shaft 18. This sprocket is chain-connected by means of the sprocket chain 43 to a sprocket wheel 44 fixed on a jack-shaft 45. Jackshaft 45 is journaled in bearings provided in depending arms of a U-shaped bracket 46 bolted to the under side of frame member 7. At one end, beyond the bracket 46, a bevel gear 47 is fixed to shaft 45 which meshes with a companion bevel gear 48 fixed on the upper end of a downwardly and inwardly inclined drive shaft 49. The upper end of drive shaft 49 is journaled in a bearing supported in an outwardly bent extension of the outer arm of bracket 46. The lower end of drive shaft 49 is connected by means of a universal joint 50 to the inner end of the rotating rod 40.

The driving mechanism for rod 41 is substantially identical to the driving mechanism of rod 40, and corresponding parts thereof have been given the same numeral designations primes added thereto. The bracket 46′ of the driving mechanism for rod 41 is positioned slightly in advance of the corresponding bracket of the drive mechanism of rod 40 in order to bring the jackshaft 45′ in transverse alignment with rod 41. It is fixed to the lower side of an angle member 51 bolted to the top faces of longitudinal bars 8 and 10 in juxtaposition to frame member 7.

When making a turn, one wheel of course rotates faster than the other. Should it be considered desirable, in order to cause each rod to rotate at a speed more nearly proportioned to the speed of forward advance of its respective side of the machine at all times, the power for driving rod 40 could be derived from wheel 15 by merely extending the jackshaft 45′ to the opposite side of the machine to support the bevel gear 47. Similarly jackshaft 45 could be extended to support bevel gear 47′.

If thought desirable to further simplify the machine both rods could be driven from one of the wheels. For example, jackshaft 45 could be extended to the opposite side of the machine and support on one end bevel gear 47′ through which rod 41 is driven, and on the other end bevel gear 47 through which rod 40 is driven.

In view of the above contemplated modification, those of the appended claims which call for driving mechanism or means for rotating the rods are not intended to be limited to a machine in which each rod is driven by power derived from the wheel on the opposite side of the machine nor to a machine having separate mechanisms for driving each rod, unless the context of the claim in other respects plainly indicates such intention.

To draw the implement, any suitable draft device may be used, such as the one shown comprising forwardly converging members 52 and 53. The rear ends of members 52 and 53 are pivotally connected to depending hitch clevises 54 and 55 bolted to the bottom side of the transverse frame bar 6, and the face of the vertical flange of angle members 10 and 12.

The shoe 37 in which the inner ends of both rods 40 and 41 are journaled is shown in detail in Figures 4 and 5. It comprises a main housing 60 with two removable bearing sections 61 and 62 and two spool elements 63 and 64. The removable bearing section 61 is positioned in the rear end of the opening 63' in the housing and bears against the shoulder 65. Bearing section 62 is positioned in the forward end of the opening 63 and bears against the end of section 61 at 63a and 63b. The forward end of bearing portion 61 and the rear end of portion 62 have semi-cylindrical recesses cut therein which together cooperate to form a cylindrical bearing opening for the spool 63. Similarly bearing portion 62 is provided with a semi-cylindrical recess in its forward end which co-operates with the semi-cylindrical shaped end of the opening 63 in the housing 60 to provide a cylindrical bearing opening for the spool 64. Spools 63 and 64 are each provided with borings of square cross-section to receive the rods 40 and 41 which are of corresponding cross-section. The spools 63 and 64 are also provided with flanges 71 which function to retain the spools in position in their respective bearing openings.

Standard 32 fits into a recess 67 in the rear end of shoe housing 60 and is bolted to the housing by means of two bolts 68 and 69. A plate 70 is bolted to the standard and the shoe by means of the bolts 68 and 69, the front end of which bears against the side bearing portion 61.

Since rod 40 projects beyond wheel 15, and rod 41 beyond wheel 16, and rod 40 is positioned rearwardly of rod 41, two identical machines may be connected together in multiple in traverse alignment, as shown in Fig. 1 wherein a portion of the second machine is shown in dotted lines, with the adjacent ends of the rods of the two machines overlapping a sufficient amount to assure complete cultivation of the swath being operated upon.

While I have shown the weeder as provided with rods of square cross-section, and have shown a shoe for the center standard adapted to support rods of square cross-section, my invention is in no way limited to the use of rods of such shape. Rods of any cross-section including round rods may be used by providing suitable shoes to support them.

Should it be thought desirable to avoid the use of a special shoe to support the two overlapping inner ends of the two rods, a pair of pendants may be provided spaced to either side of the center line of the implement sufficiently to clear the driving shafts 49 and 49', each provided with a shoe adapted to receive a single rod.

Many modifications of the precise construction shown, and the modifications described will suggest themselves to those skilled in the art, all within the scope of my invention. I do not therefore intend to be limited to such showing or description. What I consider my invention and desire to secure by Letters Patent is set forth in the following claims:

1. A rod weeder comprising a pair of rods overlapping at their inner ends and extending to opposite sides of the weeder, and means for rotating said rods through connections made with the inner ends thereof.

2. A rod weeder comprising a pair of rods overlapping at their inner ends and extending to opposite sides of the weeder, and separate means for driving each of said rods from the inner end thereof.

3. A rod weeder comprising a frame supported on a pair of wheels, a pair of rods rotatably supported from said frame, said rods overlapping at their inner ends and extending to the opposite sides of the frame, and means for rotating said rods including driving connections from said wheels to the inner ends of said rods.

4. A rod weeder comprising a frame and a supporting wheel at each side thereof, a pair of rods rotatably supported from said frame, said rods overlapping at their inner ends and extending to the opposite sides of the frame, and a driving connection between the inner end of each rod and the wheel on the opposite side of the frame.

5. A rod weeder comprising a pair of rods in substantial transverse alignment, and extending to opposite sides of the weeder, and means for rotating said rods through connections with the inner ends thereof.

6. A rod weeder comprising a pair of independently rotatable rods in substantial transverse alignment and extending to opposite sides of the weeder, and means for rotating said rods through connections with the inner ends thereof.

7. A rod weeder comprising a pair of independently rotatable rods in substantial transverse alignment and extending to opposite sides of the weeder, and separate driving mechanism for each rod connected with the inner end thereof for rotating the same.

8. A rod weeder comprising a wheel supported frame, a pair of independently rotatable rods in substantial transverse alignment and extending to opposite sides of the weeder, and a separate driving mechanism for each rod connected with the inner end thereof and deriving power from a supporting wheel, for rotating the same.

9. A rod weeder comprising a frame, a pair of rotatable rods supported from said frame on opposite sides thereof, a driving mechanism carried by each end of said frame, a driving connection from one mechanism to the inner end of one of said rods, and another driving connection from the other mechanism to the inner end of the other of said rods.

10. A rod weeder comprising a frame, a pair of rotatable rods supported from said frame on opposite sides thereof, a driving mechanism carried by each end of said frame, and a driving connection from each mechanism to the inner end of the rod on the opposite side of the frame.

11. A rod weeder comprising a frame, a pair of rotatable rods supported from said frame on opposite sides thereof, a driving mechanism carried by each end of said frame, and driving connections from said mechanisms including a pair of downwardly and inwardly inclined drive shafts, connected with the inner ends of said rods, respectively.

12. A rod weeder comprising a frame, a pair of rotatable rods supported from said frame on opposite sides thereof, a driving mechanism carried by each end of said frame and a drive shaft extending downwardly and inwardly from each mechanism and connected at its lower end through a universal joint with the inner end of a rod.

13. A rod weeder comprising a frame, a pair of rods overlapping at their inner ends, and a series of pendants on said frame adapted to rotatably support said rods at their lower ends, one of said pendants having means to support the overlapping portion of both rods.

14. A rod weeder comprising a pair of rods and a frame having a plurality of laterally spaced pendants, a shoe fixed to the lower end of each pendant, the shoe of an intermediate pendant having two bearing openings, one in advance of the other, each shoe of the pendants on one side of the said intermediate pendant having a bearing opening in transverse alignment with one of said two openings to support one of said rods and each shoe of the pendants on the other side of the said intermediate pendant having a bearing opening in transverse alignment with the other of said two openings to support the other of said rods, and means for rotating said rods.

15. A rod weeder comprising a pair of rods and a frame having a plurality of laterally spaced pendants, a shoe fixed to the lower end of each pendant, each shoe having a bearing opening, the shoe of an intermediate pendant having two openings, one in advance of the other, the openings in the shoes of the pendants on one side of said intermediate pendant being in transverse alignment with the rear opening in the shoe of said intermediate pendant to support one of said rods, and the pendants on the other side of said intermediate pendant being positioned in advance of the pendants on said one side to bring the openings in the shoes of the pendants of said other side in transverse alignment with the front opening in the shoes of said intermediate pendant to support the other of said rods, and means for rotating said rods.

16. A rod weeder comprising a frame, a pair of supporting wheels, one on each side of the frame, a pair of rods rotatably supported from said frame, said rods extending from near the center of the frame to opposite sides of said frame and beyond the tread of said carrying wheels, and means for driving said rods.

17. A rod weeder comprising a frame, a pair of supporting wheels, one on each side of the frame, a pair of rods rotatably supported from said frame, said rods extending from near the center of the frame to opposite sides of said frame and beyond the tread of said carrying wheels, and means for driving said rods from the inner ends of said rods.

18. A rod weeder comprising a rigid wheel supported frame, a pair of weeder rods rotatably supported from said frame and adapted to run below the surface of the ground throughout their entire length, said rods overlapping at their inner ends and extending to the opposite sides of the frame, and means for rotating said weeder rods through driving connections deriving power from the frame supporting wheels.

19. A rod weeder comprising a rigid wheel supported frame, a pair of weeder rods rotatably supported from said frame and adapted to run below the surface of the ground throughout their entire length and extending to the opposite sides of the frame with the inner ends extending at least to a common longitudinal line, and means for rotating said rods.

20. A rod weeder comprising a rigid wheel supported frame, a pair of weeder rods rotatably supported from said frame and adapted to run below the surface of the ground throughout their entire length and extending to the opposite sides of the frame with the inner ends extending at least to a common longitudinal line, and means for rotating said rods including driving connections connected with the inner ends of said rods.

21. A rod weeder comprising a rigid frame, a pair of weeder rods rotatably supported from said frame, gauge wheels adjacent said weeder rods for gauging the depth at which said rods operate, a drive wheel connected with the frame, said weeder rods extending to opposite sides of the frame with the inner ends thereof extending at least to a common longitudinal line, and means for rotating said weeder rods including a driving connection deriving power from said drive wheel.

22. A rod weeder comprising a rigid frame, a pair of weeder rods rotatably supported from said frame, gauge wheels adjacent said weeder rods for gauging the depth at which said rods operate, a drive wheel connected with the frame, said weeder rods extending to opposite sides of the frame with the inner ends thereof extending at least to a common longitudinal line, means for rotating said weeder rods including a driving connection deriving power from said drive wheel, and a transversely positioned downwardly and inwardly inclined drive shaft connected with the inner end of one of said weeder rods at an obtuse angle therewith.

23. The combination of a rod weeder having two weeder rods and a rod weeder supporting pendant with a rod weeder shoe supported on said pendant and comprising a main housing having a transverse longitudinally elongated opening, a removable bearing section positioned in said opening and bearing against the rear end wall thereof, a second removable bearing section positioned in said opening and bearing against the forward end of the first bearing section, the adjacent ends of the bearing sections having semi-cylindrical recesses therein to provide a cylindrical bearing opening for one of said weeder rods, the forward end wall and the forward end of the second removable bearing section having semi-cylindrical recesses therein to provide a cylindrical bearing opening for the other of said weeder rods.

In witness whereof I hereunto subscribe my name this 18th day of November, 1930.

CHARLES HOWARD ERWIN.